United States Patent [19]

Vilches et al.

[11] Patent Number: 5,324,011
[45] Date of Patent: Jun. 28, 1994

[54] COMPENSATION SYSTEM FOR SPIRAL SPRING HYSTERESIS

[76] Inventors: Jose I. Vilches; Hector Vilches, both of 353 Third St., Clifton, N.J. 07011

[21] Appl. No.: 976,360

[22] Filed: Nov. 18, 1992

Related U.S. Application Data

[63] Continuation-in-part of Ser. No. 756,995, Sep. 12, 1991, abandoned.

[51] Int. Cl.⁵ .............................................. F16F 1/10
[52] U.S. Cl. .................................... 267/156; 73/161; 242/251
[58] Field of Search ................ 267/156, 275; 242/107, 242/226, 223, 251; 73/161

[56] References Cited

U.S. PATENT DOCUMENTS

| | | | |
|---|---|---|---|
| 3,160,250 | 12/1964 | Bridwell | 267/156 X |
| 4,402,472 | 9/1983 | Burtscher | 242/107 X |
| 4,483,494 | 11/1984 | Takada | 242/107 |

Primary Examiner—Robert J. Oberleitner
Assistant Examiner—Alfred Muratori
Attorney, Agent, or Firm—M. K. Silverman

[57] ABSTRACT

A compensation system for a spiral spring hysteresis selectively provides a reactive compressive force to the spring after retractive movement of the outermost spring end relative to a fixed axial center of the spring. Such reactive compressive force reflects what, otherwise, would be the difference between the reactive forces of extension and retraction of the spring and along an axis of greatest transmissibility of force to the spring. The spring constants of extension and retraction of the spring are resultingly compensated.

8 Claims, 2 Drawing Sheets

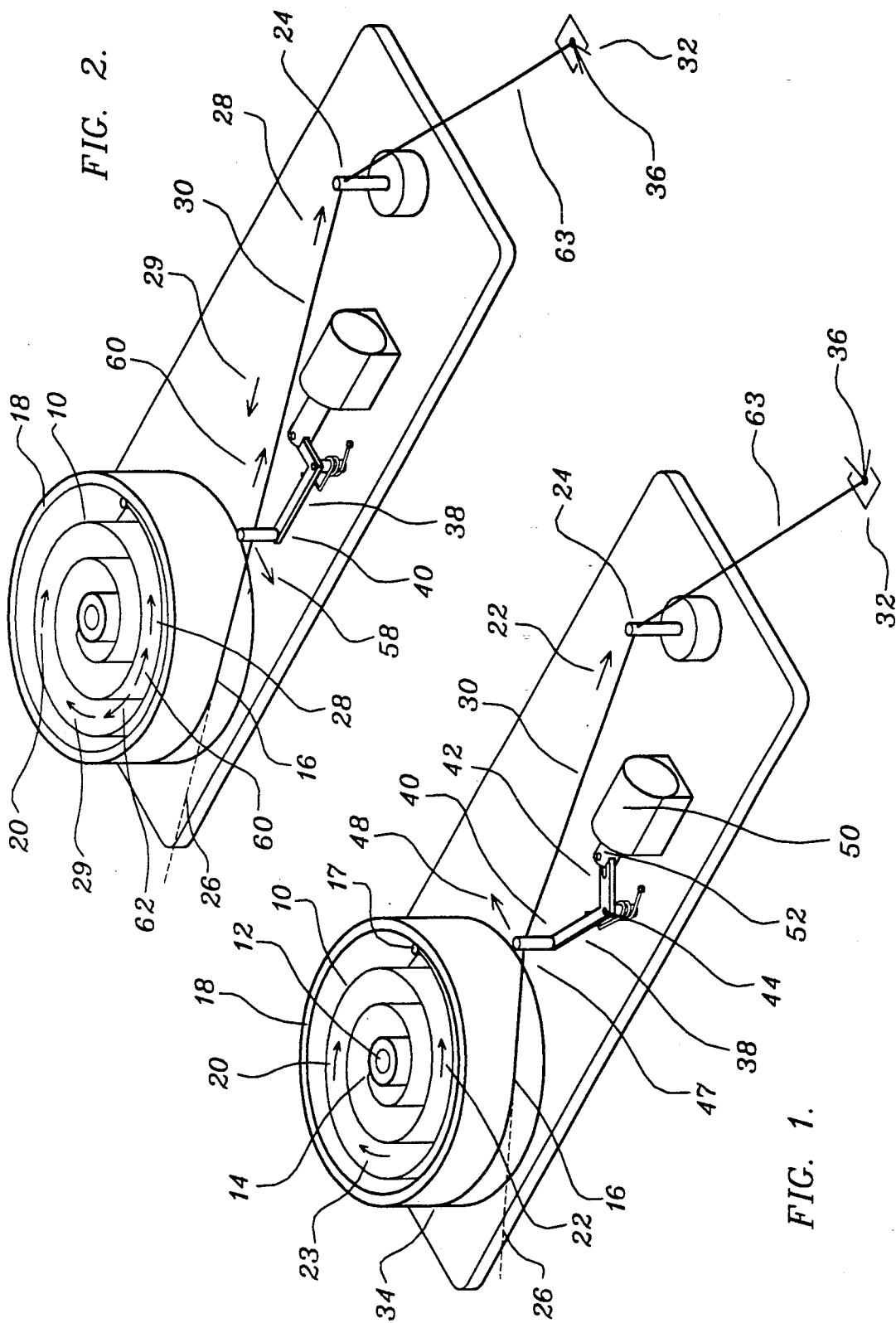

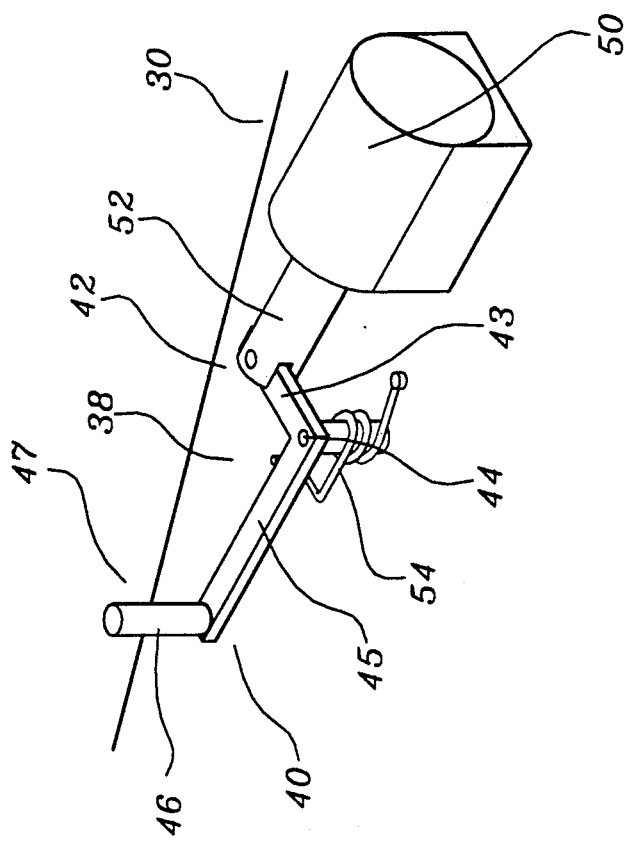
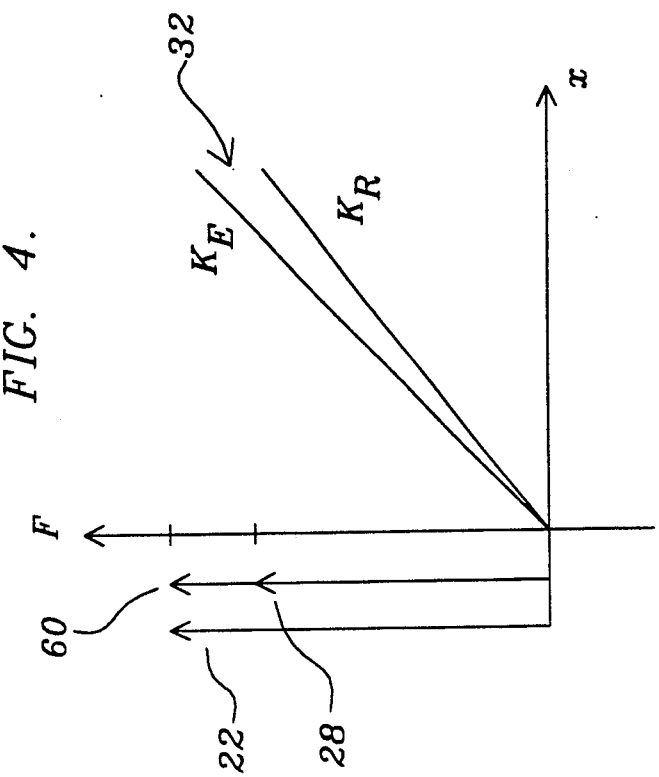

COMPENSATION SYSTEM FOR SPIRAL SPRING HYSTERESIS

REFERENCE TO RELATED APPLICATION

This case is a continuation-in-part of application Ser. No. 07/756,995, filed Sept. 12, 1991 now abandoned.

BACKGROUND OF THE INVENTION

Spiral springs are employed in many industrial applications. Their principal characteristic relative to other types of springs is that the potential energy and spring constant characteristic of a spiral spring are confined to substantially a single plane, as opposed, for example, to torsion or compression springs in which the potential energy and spring constants thereof are reconfigured in three dimensions.

Spiral springs are often used in precise biasing applications in that the spring constant thereof can be used to oppose a force that may be applied to or against a positioning surface or ends of the spiral spring. Further, the spring constants of spiral springs can generally operate over longer linear displacements than is the case with other types of springs. As such, spiral springs have developed a recognized utility in a number of types of measurement and instrumentation systems when use over a larger linear displacement is desirable.

Notwithstanding the present widespread use of spiral springs, a problem which has accompanied (and limited) such usage has been a phenomenon known as spiral spring hysteresis. Such hysteresis refers to the effect known in spiral springs in which the spring constant of extension is not precisely equal to the spring constant of retraction of the spring. This phenomenon is understandable in that, in the operation of a spiral spring, the spring constant of extension is a result of the sum of a natural structural compressive force and a reactive force opposite to the pulling force on the spiral spring, whereas the spring constant of retraction is the sum of said natural compressive force and the smaller reactive force that is opposite the force of retraction. As such, the metallic crystalline domains of the spiral spring will not behave identically to the aggregate force of extension as they will to the smaller force of retraction. Further, the greater is the range of linear displacement (x) over which the spiral spring is employed, the more apparent will become the phenomenon of spring hysteresis, in that the force equation for springs takes the form $F = -kx$, where $k$ is the spring constant. As such, the only known solution, in the prior art, to such hysteresis is to limit the range of displacement, in connection with extension and retraction, over which the spring is employed.

The inventors herein have found a spiral spring to have utility as a spring loading means of a drum or reel from which a measuring string or flexible wire may be extended or contracted as a part of a larger vector coordinate measurement apparatus. However, a difficulty which the inventors have observed in such use of a spiral spring is that small, but significant, differences in the measurement of coordinates are a function of whether a particular measurement by the string is made after the spiral spring has been in a condition of expansion or contraction, that is, whether or not the reactive force resulting from holding of the string has been at a higher or lower level, i.e., whether the aggregate compressive force on the spring has been at higher or lower level before a particular measurement. The present invention may therefore be viewed as a response to the above problem and as a solution thereto.

The inventors are not aware of any prior art which is relevant to their invention, as set forth herein.

SUMMARY OF THE INVENTION

The instant invention relates to a compensation system for spiral spring hysteresis, the system including a spiral spring having a fixed axial inner end and a moveable outer end, said spring having a spring constant of extension, a spring constant of contraction, and an axis of greatest transmissibility of force thereto. The inventive system further includes a string having a first end and a second end, said first end integrally connected to said outer end of said spiral spring, said spring having an axis in substantial alignment with said transmissibility axis of said spring, said outer end of said string being selectably extendable and retractable, as a function of the level of force applied to said second end of said string in opposition to the spring constants of the spring. The invention further includes a rocker arm having a first end, a second end, and a spring-biased pivot point medially between said first and second ends of said string, said first end including a projecting member positioned in slidable tensioning contact with said string.

The compensation system further includes means for selectably rotating and holding said rocker arm in a direction opposing the bias of said spring-biased pivot point, thereby storing potential energy in both the spring of said spring-biased comprising a part of said pivot point and in the tensioned part of said string.

The system yet further includes means for selectably releasing said rocker arm to, thusly, effect the release of said potential energy in said spring of said pivot point and in said tensioned string, said solenoid and its armature are digitally actuated and released by the user when said string has been extended away from the spring and a coordinate measurement is desired.

Upon release of said rocker arm, said potential energies in said pivot point spring and in said string are imparted to the mass of said string in the vicinity of said rocker arm and cause a resulting acceleration of said string in the direction of the release of said rocker arm, and being a component in the same direction as the direction of extension of the string. The reactive force to said acceleration component added to the reactive force of contraction thereby substantially compensates for the difference between said spiral spring constants of extension and retraction such that measurements of displacements taken by said second end of said string will not be dependent upon whether such string measurements are taken following extension or retraction of said string relative to the spiral spring.

It is accordingly an object of the invention to provide a system and means for compensation of spiral spring hysteresis.

It is another object of the invention to provide a method for compensating for the difference between the values of the spiral spring constant of extension and spiral spring constant of retraction.

It is a further object to provide a compensation system for spiral springs which will enlarge the utility of spiral springs in precision measurements applications.

It is a yet further object of the invention to provide a method and means having particular utility in systems for the precision measurement of vector coordinates.

The above and yet other objects and advantages of the present invention will become apparent in the hereinafter set forth Brief Description of the Drawings, Detailed Description of the Invention, and Claims appended herewith.

BRIEF DESCRIPTION OF THE DRAWINGS

FIG. 1 is a schematic view of the inventive system in which a rocker arm thereof is in an armed condition.

FIG. 2 is a view, similar to the view of FIG. 1, in which the rocker arm has been released.

FIG. 3 is an enlarged view of the rocker arm assembly including the solenoid control.

FIG. 4 is a graph showing the relationship between force, displacement, and the spring constants of a spiral spring and the compensating force provided by the present invention.

DETAILED DESCRIPTION OF THE INVENTION

With reference to FIG. 1, there is shown a spiral spring 10 having a fixed axial center 12 at which there is secured a first end 14 of said spring. At the upper right of FIG. 1 is shown a second end 17 of the spiral spring 10.

In the views of FIGS. 1 and 2, it is to be appreciated that spring 10 is, through fixed point 12, secured to a rotatable drum 18 which, typically, is a part of an encoder or other measurement system. Further shown upon drum 18 is an arrow which represents the direction of the internal structural force 20 of spiral spring 10 which will normally urge responsive to any external force 22 of extension that is applied in opposition to the internal structural force 20 of the spiral spring. However, it is to be noted that said external force 22 will produce a reactive force 23 that will add to said internal force 20.

Also shown in FIGS. 1 and 2, by dotted line, is an axis which may be termed the axis 26 of greatest transmissibility of force to the spiral spring. As may be noted, this axis is essentially a tangent to the outer end 16 of drum 18. The point 16 and said axis 26 are important in that, in measuring systems which are of interest to the inventors, there is attached to a first end 34 of a string 30 which is typically tensioned between the tangent point which exists at said outer end 16 of drum 18 and end point 32, this representing the point to be measured.

By way of further background in regard to the spring constant properties of a spiral spring, there is, in the view of FIG. 4, shown a graph having the distance or displacement of the string 30 as the X-axis thereof and the force exerted by the spring as the Y axis thereof. Further shown in FIG. 4 is said point 32 (also shown in FIGS. 1 and 2) to be measured by a vector coordinate measurement system in which the instant invention may be used. In FIG. 4, an upper line thereof is marked KE, indicating the spring constant of extension, while a lower line on the graph is marked KR, indicating the spring constant of retraction. As may be appreciated therefrom, the force applied at measured point 32 will differ slightly depending on whether point 32 is measured following an extension or a retraction of string 30 relative to spring 10. In other words, if point 32 is measured immediately after spring 10 is contracted, extending external force 22 will generate an internal reactive force 23 which will add to internal force 20. See FIG. 2. However, if point 32 is measured after spring 10 has been extended, e.g., to a point beyond point 32, an external force 28, required to stabilize string 30 against internal spring force 20, will be less than said force 22. Hence, the reactive force 29 of external force 28 will be less than reactive force 23 of external force 22.

This is understandable in that, under Newton's Law of Action and Reaction, the larger force 22 will cause a larger force 23, while the lesser force (of retraction) 28 will bring about a reactive lesser reactive force 29.

Of equal importance is the fact of internal asymmetries in the crystalline domains of the metal of which spiral spring 10 is formed. Although the crystalline domains of spring 10 are generally asymmetric in an unstressed planer of material such as the material of which the spiral spring is made, when a strip of such a material is bent into the configuration of a spiral spring, radial (transverse) asymmetries will develop in the transmission of the respective forces of extension and retraction.

In view of the above, the present invention may be considered as a method of compensating for the difference between the spring constant of retraction and the spring constant of extension in a spiral spring system.

A solution to the above problem has been invented in which first end 34 of string 30 is integrally connected to said outer end 16 of said drum 18. Further, a second end 36 of string 30 represents the end point 32 of a measured Cartesian coordinate vector. As may be noted in the views of FIGS. 1 and 2, said string 30 may be selectably extended or retracted as a function of the amount of force 22 or 28 respectively which is applied in opposition to the internal rotational force 20 of spring 10.

The instant invention is based upon the use of an L-shaped rocker arm 38 (See FIGS. 1 to 3) having a first end 40, a second end 42, a small segment 43, a spring-biased pivot point 44 located medially between said first end 40 and second end 42, and large segment 45. It is to be noted that said first end 40 is integral with a vertically projecting member 46 which is positioned in slidable tensioning contact with area 47 of string 30. Further said projecting member 46 applies force in the direction indicated by arrow 48 to induce tension into the string in area 47.

In FIGS. 1 and 3 there is also shown a solenoid 50 having an armature 52 which comprises a means for selectably rotating said small segment 43 of rocker arm 38 in a direction which opposes a counter-clockwise bias of a torsion spring 54 which provides the bias for said spring-biased pivot point 44, By such action, potential energy is stored both in torsion spring 54 and in tensioned string 30 in the vicinity of said vertically projecting member 46 (area 47).

In accordance with the present invention, said solenoid 50 and its armature 52 are digitally actuated and released by the user when said string 30 has been extended away from the spring 10 in the manner shown in FIG. 1, and a coordinate measurement is desired. In such actuation, armature 52 pulls to the right into the solenoid 50.

Upon release of rocker arm 38 (See FIG. 2), said potential energy of pivot point torsion spring 54 and string 30 will be imparted to the area 47 of string 30. This will cause an acceleration 58 of the string, this acceleration having a force component 60. (See FIGS. 2 and 4). This will provide a reactive force 62 in spring 10, such that said force 62, when added to said force 29, will substantially equal said reactive force 23 (the reactive force of extension.)

Systems of the above type are particularly valuable in compensating for the differences in spiral spring constants of expansion and retraction, Such differences create particularly serious errors due to a sliding friction between string 30 and the inside of aperture 24 in which sliding friction will increase as a function of the decrease in angulation between outer segment 63 of the string and the inner segment (to the left of aperture 24) thereof. The effect of the above will add a friction component to said external forces 22 and 28. It has been found that, in the absence of a system of the type of the present invention, differences in measurements of point 32 will be even greater when string 30 must pass through an aperture 24 and where an angle of substantially less than 180 degrees exist between outer segment 63 and the rest of string 30.

The digital control of solenoid 30 may be readily accomplished through any of a variety of digital electronic, opto-electronic, and electro mechanical means by which the direction of travel of spring 30 may be monitored.

Accordingly, while there has been shown and described the preferred embodiment of the present invention, it is to be appreciated that the invention may be embodied otherwise than is herein specifically shown and described and that, within said embodiment, certain changes may be made in the form and arrangement of the parts without departing from the underlying idea or principles of this invention within the scope of the Claims appended herewith.

Having thus described our invention what we claim as new, useful and non-obvious and, accordingly, secure by letters patent of the United States is:

1. A compensation system for spiral spring hysteresis, comprising:
    a spiral spring having a fixed axial inner end and a moveable outer end, said spring having a spring constant of extension, a spring constant of retraction, and an axis of greatest transmissibility of force thereto;
    a drum having an inner and outer surface, said moveable end of said spring being attached to said inner surface;
    a string having a first end and a second end, said first end integrally connected to said outer surface of said drum, said string having at least one segment having an axis in substantial alignment with said transmissibility axis of said spring, said second end of said string being selectably extensible, and retractable, as a function of the level of force applied to said second end of said string in opposition to said spring constants;
    rocker arm having a first end, a second end, and a spring-biased pivot point, the rocker arm situated medially between said first and second ends of said string, said first end of the rocker arm including a projecting member positioned in slidable tensioning contact against said string;
    means for selectably rotating said rocker arm in a direction opposing the bias of said spring-biased pivot point, thereby storing potential energy in both a spring of said pivot point and in said tensioned string; and
    means for selectably releasing said rocker arm after said selectable rotating to thereby effect a release of said potential energy in said spring of said pivot point and in said tensioned string, said releasing means selectably actuated when said string is extended or retracted toward said spiral spring,
    whereby, upon release of said rocker arm, said potential energy in said pivot point spring and said string will convert to kinetic energy having an external force component, such component causing a reactive compressive force in the spiral spring which reactive force will substantially compensate for differences between said spiral spring constants of extension and retraction such that measurements of displacement taken by said second end of said string will not be dependent upon whether such string measurements are taken following an extension or following a retraction of said string relative to said spiral spring.

2. The system as recited in claim 1, further comprising: a rigid member having an aperture in an unsecured end thereof, said rigid member located medially between said rocker arm and said second end of said string, said aperture slidably enclosing said string.

3. The system as recited in claim 2 in which said rocker arm comprises an L-shaped element.

4. The system as recited in claim 3 in which said rotating means and releasing means comprise respectively digitally controlled solenoid actuation and de-actuation means.

5. The system as recited in claim 2 in which said spring of said spring-biased pivot point comprises a torsion spring.

6. The system as recited in claim 5 in which said rotating means and releasing means both comprise digitally controlled solenoid actuation and de-actuation means.

7. The system as recited in claim 2 in which said rotating means and releasing means both comprise respectively digitally controlled solenoid actuation de-actuation means.

8. The system as recited in claim 1 in which said rotating means and releasing means comprise respectively digitally controlled solenoid actuation and de-actuation means.

* * * * *